(12) United States Patent
Murata et al.

(10) Patent No.: US 12,661,837 B2
(45) Date of Patent: Jun. 23, 2026

(54) INJECTION MOLDING METHOD AND INJECTION MOLDING MACHINE

(71) Applicant: NISSEI PLASTIC INDUSTRIAL CO., LTD., Nagano-ken (JP)

(72) Inventors: Hirofumi Murata, Hanishina-gun (JP); Toshimi Kato, Hanishina-gun (JP); Hozumi Yoda, Hanishina-gun (JP)

(73) Assignee: NISSEI PLASTIC INDUSTRIAL CO., LTD., Nagano-Ken (JP)

( * ) Notice: Subject to any disclaimer, the term of this patent is extended or adjusted under 35 U.S.C. 154(b) by 127 days.

(21) Appl. No.: 18/377,176

(22) Filed: Oct. 5, 2023

(65) Prior Publication Data

US 2024/0116228 A1     Apr. 11, 2024

(30) Foreign Application Priority Data

Oct. 6, 2022     (JP) ................................. 2022-161551

(51) Int. Cl.
| | |
|---|---|
| *B29C 45/56* | (2006.01) |
| *B29C 45/17* | (2006.01) |
| *B29C 45/26* | (2006.01) |
| *B29C 45/66* | (2006.01) |
| *B29C 45/76* | (2006.01) |
| *B29K 101/10* | (2006.01) |

(52) U.S. Cl.
CPC ........ *B29C 45/561* (2013.01); *B29C 45/1774* (2013.01); *B29C 45/2602* (2013.01); *B29C 45/66* (2013.01); *B29C 2045/565* (2013.01); *B29C 45/7653* (2013.01); *B29C 2945/76505* (2013.01); *B29C 2945/76709* (2013.01); *B29K 2101/10* (2013.01)

(58) Field of Classification Search
CPC ............ B29C 45/2602; B29C 45/2669; B29C 45/7653; B29C 45/1679; B29C 45/1774; B29C 45/66; B29C 45/73; B29C 45/561; B29C 45/5625
See application file for complete search history.

(56) References Cited

U.S. PATENT DOCUMENTS

| | | | |
|---|---|---|---|
| 2009/0121385 A1* | 5/2009 | Yonemochi | ......... B29C 45/2669 |
| | | | 264/255 |
| 2012/0146260 A1 | 6/2012 | Murata et al. | |

FOREIGN PATENT DOCUMENTS

WO     WO 2011/161899 A1     12/2011

* cited by examiner

*Primary Examiner* — Thu Khanh T. Nguyen
(74) *Attorney, Agent, or Firm* — Birch, Stewart, Kolasch & Birch, LLP

(57) ABSTRACT

Mold clamping conditions, including a predetermined mold gap, a predetermined mold clamping force, a predetermined back pressure for a movable mold, a predetermined mold closing pressure, and a predetermined mold closing pressure adjustment condition associated with the compression state of a molding material, are set beforehand. At the time of molding, an injection filling process for causing the injection device to inject and fill the molding material into a mold of a mold clamping device for which the mold clamping conditions have been set is performed, and, after completion of the injection filling process, a compression process is performed on the basis of the mold clamping conditions including the mold closing pressure adjustment condition.

4 Claims, 9 Drawing Sheets

INJECTION MOLDING METHOD AND INJECTION MOLDING MACHINE

TECHNICAL FIELD

The present invention relates to an injection molding method and an injection molding machine which perform molding by injecting and filling a molding material by an injection device into a mold clamped by a mold clamping device.

BACKGROUND ART

In a conventional molding method using an injection molding machine, in general, mold clamping is performed through application of high pressure (large mold clamping force) to the mold. However, since this general mold clamping method involves an increase in energy consumption resulting from application of high pressure (large mold clamping force), this general mold clamping method is not necessarily a desirable method from the viewpoint of energy saving. Therefore, there has been demanded a molding method which performs mold clamping by applying a bare minimum mold clamping force, while securing the high quality and homogeneity of molded products, and the present applicant has proposed a new molding method which meets this demand (see Patent Literature 1).

A method of molding using an injection molding machine disclosed in Patent Literature 1 has an object of securing the high quality of molded products, simplifying molding conditions and facilitating setting of the molding conditions, shortening molding cycle time, and enhancing productivity and economical efficiency. This object has been achieved by the method in which a predetermined mold gap is produced by a relation of force between an always constant molding-mold clamping force and a constant molding injection pressure, which are applied to resin filled into a mold, and natural compression is caused by the molding-mold clamping force even after resin filling ends. Specifically, molding is performed by injecting and filling resin, under a predetermined injection pressure, by an injection device into a mold composed of a stationary mold and a movable mold and clamped by a mold clamping device with a predetermined mold clamping force. A mold clamping device which allows compression (natural compression) of the resin as a result of solidification of at least the resin within the mold is used as the mold clamping device. An injection pressure (molding injection pressure) and a mold clamping force (molding mold clamping force) which produce a predetermined gap (mold gap) between the movable mold and the stationary mold at the time of injection filling and enable molding of defect-free products are obtained and set in advance. Furthermore, at the time of production, the mold clamping device is clamped with the molding mold clamping force, the molding injection pressure is set as a limit pressure, and the resin is injected and filled into the mold by driving the injection device. Subsequently, after elapse of a predetermined cooling time, a molded product is taken out.

SUMMARY OF INVENTION

Technical Problem

However, the above-described method of molding using an injection molding machine disclosed in Patent Literature 1 has the following problems to be solved.

Namely, although no problem occurs in the case where a molding material is resin of low viscosity (high fluidity), in the case where the molding material is resin of low fluidity (high viscosity), filling of the resin into the cavity of the mold is not performed smoothly, which may result in generation of molding defects due to shortage of resin, may result in generation of variation among molded products (deterioration of homogeneity), and may render molding (production) difficult depending on the combination of the resin of low fluidity (high viscosity) and the shape of the mold cavity.

In particular, in the case of a thermosetting resin, it exhibits a large flow resistance at the time of injection filling and tends to prolong a molding cycle. Therefore, as compared with a resin of high fluidity, the speed at which the thermosetting resin is injected and filled into the mold becomes relatively low. As a result, a variation in resin hardening speed is likely to arise between a region within a cavity of the mold near a gate and a region near an end of the cavity remote from the gate. Also, since the thermosetting resin hardens due to high temperature within the mold, the above-described molding method has a drawback in that control of the temperature of the mold, pressure control for mold closing pressure in a compression process, and grasp of behavior of resin within the mold are not easy.

An object of the present invention is to provide an injection molding method and an injection molding machine which have solved the above-described problems present in the background art.

Solution to Problem

In order to solve the above-described object, an injection molding method according to the present invention comprises an injection filling process (S7) of injecting and filling a molding material Rm by an injection device Mi into a mold D composed of a movable mold Dm and a stationary mold Dc and having a mold gap Lg therebetween, and a compression process (S11 to S15) which is performed after completion of the injection filling process (S7) so as to compress the molding material Rm by applying a predetermined mold closing pressure Pp to the mold D by a mold clamping device Mc. The injection molding method is characterized in that mold clamping conditions, including a predetermined mold gap Lg, a predetermined mold clamping force Pc, a predetermined back pressure Pb for the movable mold Dm, a predetermined mold closing pressure Pp, and a predetermined mold closing pressure adjustment condition T for a compression state of the molding material Rm, are set beforehand, at the time of molding, the injection filling process (S7) for causing the injection device Mi to inject and fill the molding material Rm is performed for the mold D of the mold clamping device Mc for which the mold clamping conditions have been set, and, after completion of the injection filling process (S7), the compression process (S11 to S15) is performed on the basis of the mold clamping conditions including the mold closing pressure adjustment condition T.

In order to solve the above-described object, an injection molding machine M according to the present invention comprises an injection device Mi which performs an injection filling process of injecting and filling a molding material Rm into a mold D composed of a movable mold Dm and a stationary mold Dc and having a predetermined mold gap Lg therebetween, a mold clamping device Mc which performs a compression process of applying a predetermined mold closing pressure Pp to the mold D into which the molding material Rm has been injected and filled, thereby compressing the molding material Rm, and a molding machine controller 2 which controls the injection device Mi and the mold clamping device Mc. The injection molding machine M is characterized that the molding machine controller 2 is configured to allow setting of mold clamping conditions for the clamping device Mc, the mold clamping conditions including a predetermined mold gap Lg, a predetermined mold clamping force Pc, a predetermined back pressure Pb for the movable mold Dm, a predetermined mold closing pressure Pp, and a predetermined mold closing pressure adjustment condition T for a compression state of the molding material Rm, the injection device Mi performs the injection filling process of injecting and filling the molding material Rm into the mold D of the mold clamping device Mc for which the mold clamping conditions have been set, and the mold clamping device Mc performs the compression process for the mold D, into which the molding material Rm has been injected and filled, on the basis of the mold clamping conditions including the mold closing pressure adjustment condition T.

When the injection molding method is performed in accordance with a preferred mode of the invention, the size of the mold gap Lg between the movable mold Dm and the stationary mold Dc may be contained as the compression state of the molding material Rm. Also, the magnitude of the mold closing pressure Pp may be contained as the compression state of the molding material Rm. and the magnitude of viscosity Vr of the molding material Rm may be contained as the compression state of the molding material Rm. Furthermore, the mold gap Lg, the mold closing pressure Pp, and the viscosity Vr may be graphically displayed on a display 2*d*. Furthermore, the molding material Rm is desirably a thermosetting resin material. Notably, the injection filling process (S7) may be ended when the movable mold Dm reaches a compression start position Xp set beforehand.

When the injection molding machine M is configured in accordance with a preferred mode of the invention, the molding machine controller 2 may have a display 2*d* which graphically displays the mold gap Lg, the mold closing pressure Pp, and the viscosity Vr by a graphic display section 2*dg*. Also, the mold clamping device Mc may be configured to include a movable platen 5 which is supported by a tie bar mechanism section 4 to be movable forward and rearward and which supports the movable mold Dm, a mold clamping platen 7 which is supported by the tie bar mechanism section 4 to be movable forward and rearward and which includes a mold clamping drive mechanism section 6 for performing clamping of the movable mold Dm, and a chuck mechanism section 8 which is integrally provided on the mold clamping platen 7 and can fix the mold clamping platen 7 at a predetermined position on the tie bar mechanism section 4. Furthermore, it is desired that the mold clamping drive mechanism section 6 uses a mold clamping cylinder 6*c*, and a meter-out circuit 9 is connected to the mold clamping cylinder 6*c*.

Advantageous Effects of Invention

The injection molding method and the injection molding machine M according to the present invention yield remarkable effects as follows.

(1) Even in the case where the molding material R is low in fluidity (high in viscosity), since a resin flow channel becomes wider by an amount corresponding to the size of the mold gap Lg, filling of the resin into the cavity of the mold D can be performed smoothly. Thus, it is possible to avoid the problem that molding (production) becomes difficult depending on the type of the molding material R, and to expand the range of molding materials Rm which can be used for injection molding, thereby enhancing universality for objects to be molded.

(2) Even in the case of molding of a thermosetting resin or the like which exhibits a large flow resistance at the time of injection filling and tends to prolong a molding cycle, since the temperature control at the time of heating the mold and control of the mold closing pressure in the compression process can be optimized, it is possible to suppress generation of molding defects due to shortage of resin and generation of variation among molded products, thereby improving the quality of molded products.

(3) In a preferred mode of the injection molding method in which the size of the mold gap Lg between the movable mold Dm and the stationary mold Dc is contained as the compression state of the molding material Rm, since a change in the compression state of the molding material Rm in the mold D which occurs due to a change in the size of the mold gap Lg can be grasped, it is possible to optimize setting of the mold closing pressure adjustment condition T, such as compression timing, in accordance with the mold gap Lg.

(4) In a preferred mode of the injection molding method in which the magnitude of the mold closing pressure Pp is contained as the compression state of the molding material Rm, since a change in the compression state of the molding material Rm in the mold D which occurs due to a change in the magnitude of the mold closing pressure Pp can be grasped, it is possible to optimize the mold closing pressure adjustment condition T, such as compression timing, in accordance with the mold closing pressure Pp.

(5) In a preferred mode of the injection molding method in which the magnitude of viscosity of the molding material Rm is contained as the compression state of the molding material Rm, since a change in the compression state of the molding material Rm which occurs due to a change in the magnitude of the viscosity of the molding material Rm can be grasped, it is possible to optimize the mold closing pressure adjustment condition T, such as compression timing, in accordance with the viscosity Vr of the molding material Rm.

(6) In a preferred mode in which the display 2*d* is provided in the molding machine controller 2 and the mold gap Lg, the mold closing pressure Pp, and the viscosity Vr (change ΔP in the mold closing pressure Pp per unit time) are displayed graphically in the graphic display section 2*dg* of the display 2*b*, since an operator can grasp the mold gap Lg, the mold closing pressure Pp, and the viscosity Vr through the graphic display, the operator can perform setting of the mold closing pressure adjustment condition T accurately and easily.

(7) In a preferred mode in which the molding material Rm is a thermosetting resin, it is possible to provide an injection molding method (an injection molding machine M) which is the most suitable for molded products using a low fluidity molding material.

(8) In a preferred mode of the injection molding method in which the injection filling process (S7) is ended when the movable mold Dm reaches a compression start position Xp set beforehand, since a desirable compression processing for the resin Rd can be performed after filling of the resin Rd, it is possible to provide an injection molding method which is the most suitable from the viewpoint of, for example, performing compression molding for molded products using a low fluidity molding material or the like.

(9) In a preferred mode of the injection molding machine M in which the mold clamping device Mc is configured to include the movable platen 5 which is supported by the tie bar mechanism section 4 to be movable forward and rearward and which supports the movable mold Dm, the mold clamping platen 7 which is supported by the tie bar mechanism section 4 to be movable forward and rearward and which includes the mold clamping drive mechanism section 6 for performing clamping of the movable mold Dm, and the chuck mechanism section 8 which is integrally provided on the mold clamping platen 7 and can fix the mold clamping platen 7 at a predetermined position on the tie bar mechanism section 4, it is possible to secure easiness of implementation and certainty of implementation; for example, it is possible to easily and reliably carry out the compression process by the mold clamping device Mc.

(10) In a preferred mode in which the mold clamping cylinder 6c is used in the mold clamping drive mechanism section 6, since the hydraulic circuit including the mold clamping cylinder 6c can be utilized, back pressure control for the resin Rd at the time of injection filling becomes possible, and molding quality can be improved.

(11) In a preferred mode in which the meter-out circuit 9 is connected to the mold clamping cylinder 6c, since a relatively simple hydraulic circuit 3 can be realized, implementation can be performed easily at low cost, and the back pressure control at the time of molding can be performed easily and reliably.

DESCRIPTION OF EMBODIMENTS

Next, a preferred embodiment of the present invention will be described in detail based on the drawings.

First, the structure of an injection molding machine M which can carry out an injection molding method according to the present embodiment will be described with reference to FIGS. 1 to 5.

Figure 1:
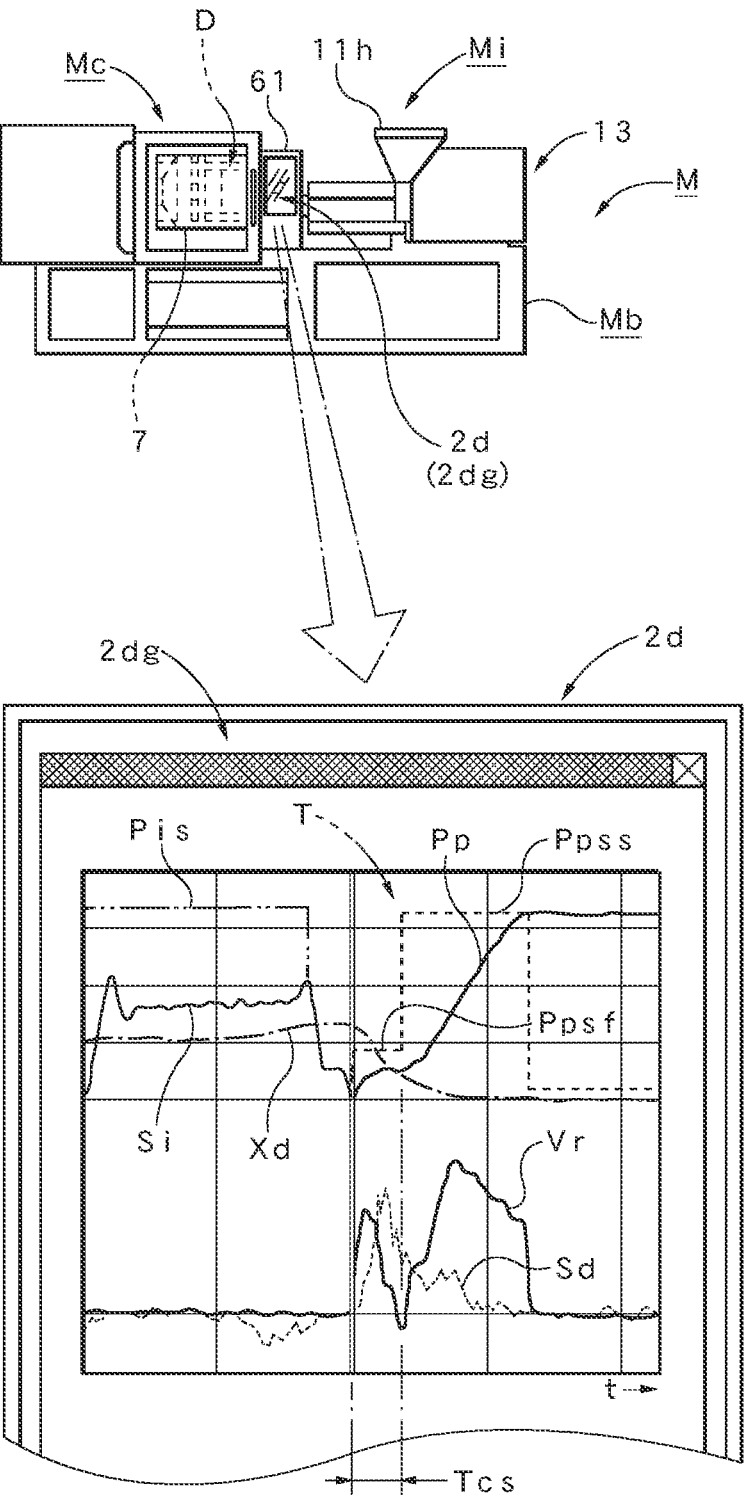
FIG. 1 is a schematic configurational diagram of an injection molding machine according to a preferred embodiment of the present invention, the diagram containing a partially extracted screen of a graphic display section of a display provided in the injection molding machine.
Figure 2:
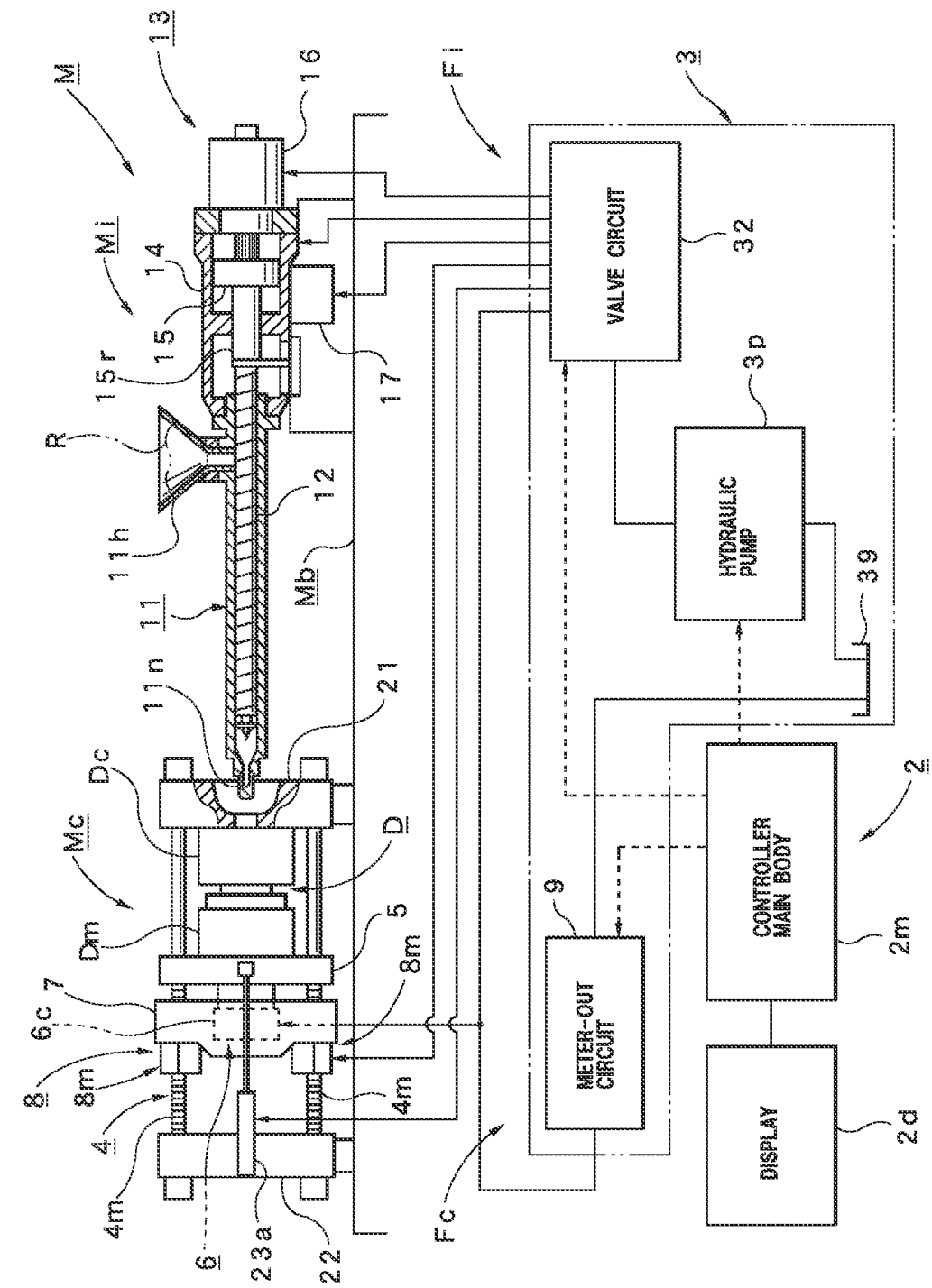
FIG. 2 is a configurational diagram of the injection molding machine.

In FIGS. 1 and 2, the injection molding machine is denoted by reference sign M and includes an injection device Mi and a mold clamping device Mc, which are disposed on a top surface of a machine base Mb.

The injection device Mi is disposed on the machine base Mb such that the injection device Mi can move forward and rearward. The injection device Mi includes a heating cylinder 11 having an injection nozzle 11n at its forward end and a hopper 11h at its rear portion. A screw 12 is inserted into an internal space of the heating cylinder 11, and a screw drive section 13 is disposed at a rear end of the heating cylinder 11. The screw drive section 13 has an injection cylinder 14 including a single-rod-type injection ram 15. A ram rod 15r projecting forward from the injection ram 15 is coupled to a rear end of the screw 12. A shaft of a screw rotating motor (oil motor) 16 attached to the injection cylinder 14 is splined-coupled to a rear end of the injection ram 15. Reference sign 17 denotes an injection device moving cylinder which moves the injection device Mi forward and rearward, thereby establishing nozzle touch to the mold D or cancelling the nozzle touch.

The mold clamping device Mc includes, as a basic structure, a movable platen 5 which is supported by a tie bar mechanism section 4 to be movable forward and rearward and which supports a movable mold Dm, a mold clamping platen 7 which is supported by the tie bar mechanism section 4 to be movable forward and rearward and which includes a mold clamping drive mechanism section 6 for performing clamping of the movable mold Dm, and a chuck mechanism section 8 which is integrally provided on the mold clamping platen 7 and can fix the mold clamping platen 7 at a predetermined position on the tie bar mechanism section 4.

Figure 3:
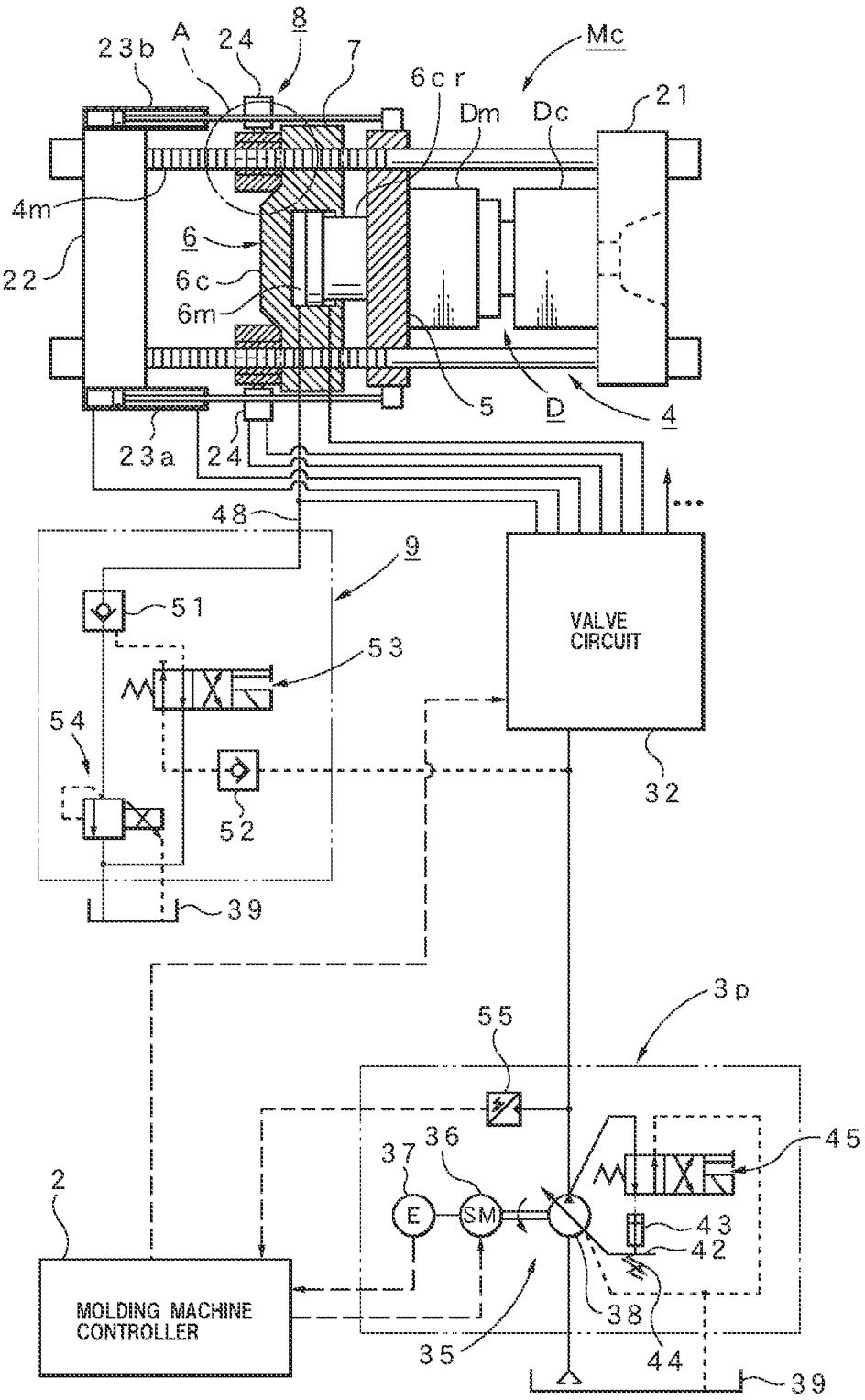
FIG. 3 is a specific circuit diagram of a hydraulic circuit and a mold clamping device of the injection molding machine.

More specifically, as shown in FIGS. 2 and 3, a first stationary plate 21 and a second stationary plate 22 are fixed on the top surface of the machine base Mb such that the first stationary plate 21 and the second stationary plate 22 are separated from each other. Four tie bars 4m are provided to extend parallel between four corners of the first stationary plate 21 and four corners of the second stationary plate 22. The movable platen 5 and the mold clamping platen 7 are slidably supported by the tie bars 4m. As a result, the stationary mold Dc is supported by the forward stationary plate 21, the movable mold Dm is supported by the movable platen 5, and a mold D is constituted by the stationary mold Dc and the movable mold Dm.

As shown in FIG. 3, the mold clamping drive mechanism section 6 is incorporated in the mold clamping platen 7. The mold clamping drive mechanism section 6 is composed of a single-rod-type mold clamping cylinder 6c, and an end of a forwardly projecting mold clamping ram 6cr is fixed to a back surface of the movable platen 5. Notably, reference signs 23a and 23b denote left and right single-rod-type mold opening/closing cylinders provided between the rear stationary plate 22 and the movable platen 5.

Figure 4:
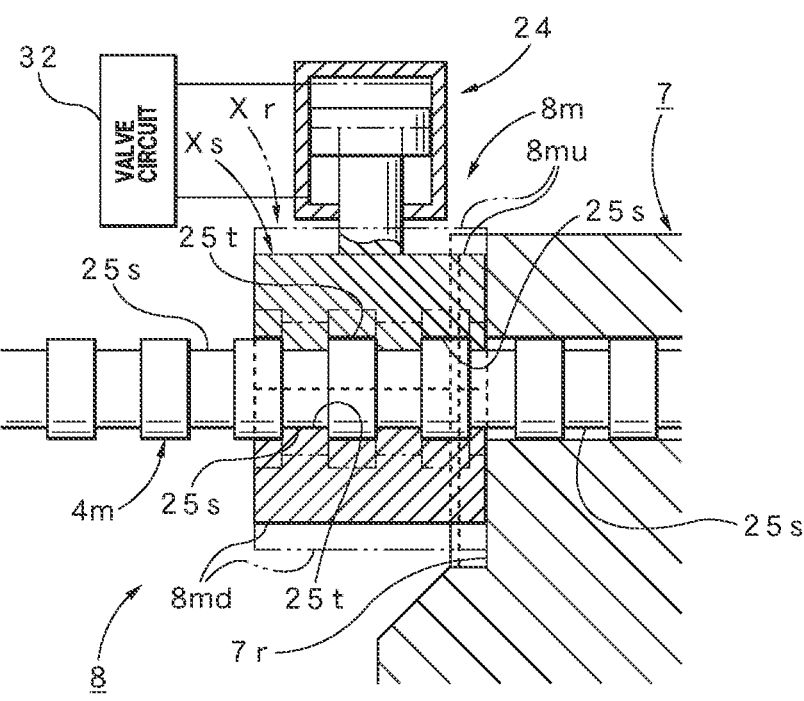
FIG. 4 is an enlarged extracted cross-sectional view of a chuck mechanism section of the mold clamping device of the injection molding machine; specifically, a portion of FIG. 3 in a dot-dashed circle A.

The chuck mechanism section 8 is disposed on the back surface (on the side toward the second stationary plate 22) of the mold clamping platen 7. The chuck mechanism section 8 is composed of four chuck sections 8m corresponding to the four tie bars 4m. The structure of one tie bar 4m will be described (other tie bars 4m have the same structure). As shown in FIG. 4, the tie bar 4m has annular grooves 25s formed on its outer circumferential surface at predetermined intervals along the axial direction. Notably, a range in which the grooves 25*s* are provided is chosen such that the chuck section 8*m* effectively functions at least over the entire moving range of the mold clamping platen 7 in the axial direction.

The structure of one chuck section 8*m* will be described (other chuck sections 8*m* have the same structure). The chuck section 8*m* includes upper and lower chuck halves (half nuts) 8*mu* and 8*md* and is configured to chuck the tie bar 4*m* by sandwiching it by the chuck halves 8*mu* and 8*md*. In the case of the illustrated example, as shown in FIG. 4, an engagement portion 7*r* having a guiderail mechanism is provided on the back surface of the mold clamping platen 7, the upper and lower chuck halves 8*mu* and 8*md* are engaged with the engagement portion 7*r* to be movable upward and downward, respectively, and the chuck section 8*m* is configured such that the upper and lower chuck halves 8*mu* and 8*md* can be moved in directions opposite to each other by a link mechanism. A chuck cylinder 24 is coupled to one chuck half 8*mu* so as to move the upper and lower chuck halves 8*mu* and 8*md* upward and downward, respectively. Annular protrusions 25*t* which are fitted into the grooves 25*s* provided on the outer circumferential surface of the tie bar 4*m* are formed on inner circumferential surfaces of the upper and lower chuck halves 8*mu* and 8*md*.

By virtue of the above-described configuration, when the piston ram of the chuck cylinder 24 shown in FIG. 4 is forced to project, the chuck halves 8*mu* and 8*md* move to respective chucking positions Xs; i.e., the positions of the chuck halves 8*mu* and 8*md* shown by a solid cross section. As a result, the protrusions 25*t* engage with the grooves 25*s*, thereby fixing the mold clamping platen 7. When the piston ram of the chuck cylinder 24 is retreated, the chuck halves 8*mu* and 8*md* move to respective chucking cancellation positions Xr; i.e., the positions of the chuck halves 8*mu* and 8*md* shown by imaginary lines. As a result, the protrusions 25*t* are disengaged from the grooves 25*s*, thereby permitting movement of the mold clamping platen 7 in the axial direction. Notably, the illustrated structure of the chuck section 8*m* is one example, and the chuck section 8*m* may be configured, for example, such that, since four chuck sections 8*m* are provided, the inner circumferential surfaces of the chuck halves 8*md* are made flat, and the protrusions 25*t* are provided only on the inner circumferential surfaces of the chuck halves 8*mu*. Basically, the chuck section 8*m* can be replaced with any of various known mechanisms having the same functions.

In the case where, as described above, the mold clamping device Mc is configured to include the movable platen 5 which is supported by the tie bar mechanism section 4 to be movable forward and rearward and which supports the movable mold Dm, the mold clamping platen 7 which is supported by the tie bar mechanism section 4 to be movable forward and rearward and which includes the mold clamping drive mechanism section 6 (the mold clamping cylinder 6*c*) for performing clamping of the movable mold Dm, and the chuck mechanism section 8 which is integrally provided on the mold clamping platen 7 and can fix the mold clamping platen 7 at a predetermined position on the tie bar mechanism section 4, it is possible to secure easiness of implementation and certainty of implementation, for example, it is possible to easily and reliably carry out the compression process by the mold clamping device Mc.

Meanwhile, the hydraulic circuit denoted by reference sign 3 includes, as a main portion, a variable-delivery-type pump 3*p* serving as a hydraulic drive source, a valve circuit 32 which performs various types of switching and control, and a meter-out circuit 9 connected to the mold clamping cylinder 6*c*. In the case where, as described above, the injection device Mi and the mold clamping device Mc are driven by the hydraulic circuit 3 including the hydraulic pump 3*p*, since back pressure control based on hydraulic pressure can be utilized, in particular, it becomes possible to perform the back pressure control for the resin Rd at the time of injection filling, thereby contributing to improvement of molding quality.

As shown in FIG. 3, the hydraulic pump 3*p* includes a pump unit 35 and a servo motor 36 which rotatively drives the pump unit 35. Notably, reference sign 37 denotes a rotary encoder for detecting the rotational speed of the servomotor 36. The pump unit 35 includes a pump body 38 composed of a swash-plate-type piston pump. Therefore, the pump unit 35 has a swash plate 42. When the inclination angle of the swash plate 42 (swash plate angle) is increased, the stroke of a pump piston in the pump body 38 increases, and the discharge flow rate of the pump unit increases. When the swash plate angle is decreased, the stroke of the pump piston decreases and the discharge flow rate of the pump unit decreases. As a result, by setting the swash plate angle to a predetermined angle, it becomes possible to set a fixed discharge flow rate at which the discharge flow rate (the maximum capacity) is fixed to a predetermined magnitude. A control cylinder 43 and a return spring 44 are additionally provided for the swash plate 42, and the control cylinder 43 is connected to a discharge port of the pump unit 35 (the pump body 38) via a switching valve (electromagnetic valve) 45. As a result, the angle of the swash plate 42 (swash plate angle) can be changed by controlling the control cylinder 43.

An intake port of the pump unit 35 is connected to an oil tank 39, and the discharge port of the pump unit 35 is connected to a primary side of the valve circuit 32. A secondary side of the valve circuit 32 is connected to the injection cylinder 14, the screw rotating motor 16, the injection device moving cylinder 17, the mold clamping cylinder 6*c*, the mold opening/closing cylinders 23*a* . . . , the chuck cylinders 24, which have been described above, and is also connected to other actuators of various types such as an unillustrated ejector cylinder. Therefore, the valve circuit 32 includes switching valves (electromagnetic valves) connected to these actuators. Each switching valve is composed of one or more valve components, necessary additional hydraulic components, etc. and has a switching function associated with supply of working fluid, stoppage of the working fluid, and discharge of the working fluid at least for the injection cylinder 14, the screw rotating motor 16, the injection device moving cylinder 17, the mold clamping cylinder 6*c*, the mold opening/closing cylinders 23*a* . . . , the chuck cylinders 24, which have been described above, and for other actuators of various types such as an unillustrated ejector cylinder. Thus, the discharge flow rate and discharge pressure of the variable-delivery-type hydraulic pump 31 can be changed by variably controlling the rotational speed of the servo motor 36.

Furthermore, as shown in FIG. 3, a flow-in side of the meter-out circuit 9 is connected to a working fluid line 48 connected to an oil chamber (rear oil chamber) 6*m* of the mold clamping cylinder 6*c*, and a flow-out side of the meter-out circuit 9 is connected to the oil tank 39. The meter-out circuit 9 includes check valves 51 and 52, a directional control valve (electromagnetic valve) 53, and a relief valve (back pressure control valve) 54, which are connected as shown in FIG. 3.

By virtue of this configuration, in an injection filling process, control for the mold clamping device Mc can be performed only by back pressure control using the meter-out circuit 9. Namely, by virtue of the function of the meter-out circuit 9, when the pressure of the resin Rd within the mold D is equal to or lower than a set back pressure Pb [kN], the pressure of the resin Rd is maintained at that pressure. When the pressure of the resin Rd exceeds the back pressure Pb [kN], by virtue of the function of the relief valve 54, the pressure of the resin Rd is maintained at the back pressure Pb [kN].

In the case where the meter-out circuit 9 connected to the mold clamping cylinder 6c is provided as described above, since the relatively simple hydraulic circuit 3 can be realized, implementation can be performed easily at low cost. Additionally, the back pressure control at the time of molding can be performed easily and reliably. Also, the injection device Mi and the mold clamping device Mc can be driven by the common hydraulic pump 3p. Namely, at the time of injection filling, only the back pressure control for the mold clamping device Mc is necessary and drive force by the hydraulic pump becomes unnecessary. Therefore, of two hydraulic pumps; i.e., the hydraulic pump on the injection device Mi side and the hydraulic pump on the mold clamping device Mc side, which normally become necessary at the time of injection filling, the hydraulic pump on the mold clamping device Mc side becomes unnecessary, which contributes to remarkable cost reduction.

Meanwhile, reference sign 2 denotes a molding machine controller. A controller main body 2m and a display 2d are contained in the molding machine controller 2. The above-described servo motor 36 is connected to a servo amplifier output port of the controller main body 2m, and the valve circuit 32 is connected to a control signal output port of the controller main body 2m. Encoder pulses obtained from the rotary encoder 37 are input to a servo amplifier of the controller main body 2m. Notably, reference sign 55 denotes a pressure sensor for detecting the pressure of the working fluid supplied to the primary side of the valve circuit 32. The pressure detected by the pressure sensor 55 is given to the controller main body 2m of the molding machine controller 2.

The controller main body 2m includes hardware such as a CPU, an internal memory, etc. and provides a computer function. Accordingly, a control program (software) for executing various types of control processing (sequence control) is stored in the internal memory, and a data memory for storing various types of data (database) is contained. The control program includes a control program for realizing at least a portion of the injection molding method according to the present embodiment.

FIG. 1 shows the external configuration of the entire injection molding machine M. The display 2d of the molding machine controller 2 is provided on a side panel 61 which stands in the vicinity of an intermediate portion of the injection molding machine M. The display 2d can perform various types of displays and has a touch panel added thereto. Therefore, an operator can perform various types of setting operations, selection operations, etc. by using this touch panel.

As shown by a partially extracted screen illustration shown in FIG. 1, a graphic display section 2dg is displayed on the display 2d according to the present invention. By this graphic display section 2dg, at least the mold position (measured value) Xd, mold closing pressure (measured value) Pp, and viscosity (calculated value) Vr can be graphically displayed. In the illustrated example, in addition to these operation-related physical quantities, injection speed (measured value) Si, injection pressure (set value) Pi, and mold opening/closing speed (measured value) Sd are displayed. Additionally, various types of operation-related physical quantities (monitoring data) can be graphically displayed when necessary. Notably, the differential value of the mold closing pressure Pp; i.e., pressure change ΔP per unit time, is used as the viscosity (calculated value) Vr.

As described above, the display 2d is provided in the molding machine controller 2, and a mold gap Lg, the mold closing pressure Pp, and the viscosity Vr (a change ΔP in the mold closing pressure Pp per unit time) are graphically displayed by displaying the graphic display section 2dg on the display 2d. Since the operator can easily grasp the mold gap Lg, mold closing pressure Pp. and the viscosity Vr from the graphic display, the operator can accurately and easily perform setting of a mold closing pressure adjustment condition T, such as a compression adjustment time Tc, which will be described later.

Namely, since the mold position Xd (the size of the mold gap Lg between the movable mold Dm and the stationary mold Dc), the magnitude of the mold closing pressure Pp, and the magnitude of viscosity Vr of the molding material Rm are included, the operator can grasp easily and visually, at a glance, all of a change in the compression state of the molding material Rm within the mold D, which change occurs due to a change in the size of the mold gap Lg, a change in the compression state of the molding material Rm within the mold D, which change occurs due to a change in the mold closing pressure Pp, and a change in the compression state of the molding material Rm within the mold D, which change occurs due to a change in the viscosity of the material Rm. Namely, since the compression state of the molding material Rm can be grasped easily over the entire period from the start of the injection filling process to the end of the compressing process, it is possible to optimize the mold closing pressure adjustment condition T, such as compression timing, in accordance with these changes in the compression state.

Accordingly, as shown in FIG. 1 (and FIG. 7), the graphic display section 2dg contains not only the injection filling process from the start of injection to the end of injection, but also the compressing process (a post-filling process) which starts after the end of injection and continues until a molded product is taken out. In FIG. 1 (and FIG. 7), reference sign te denotes a time point at which the injection filling process ends, and an area on the left side of this time point te is the period of the injection filling process and an area on the right side of this time point te is the period of the compressing process (post-filling process). Notably, in each of FIGS. 1 and 7, the horizontal axis shows time t.

Figure 5:
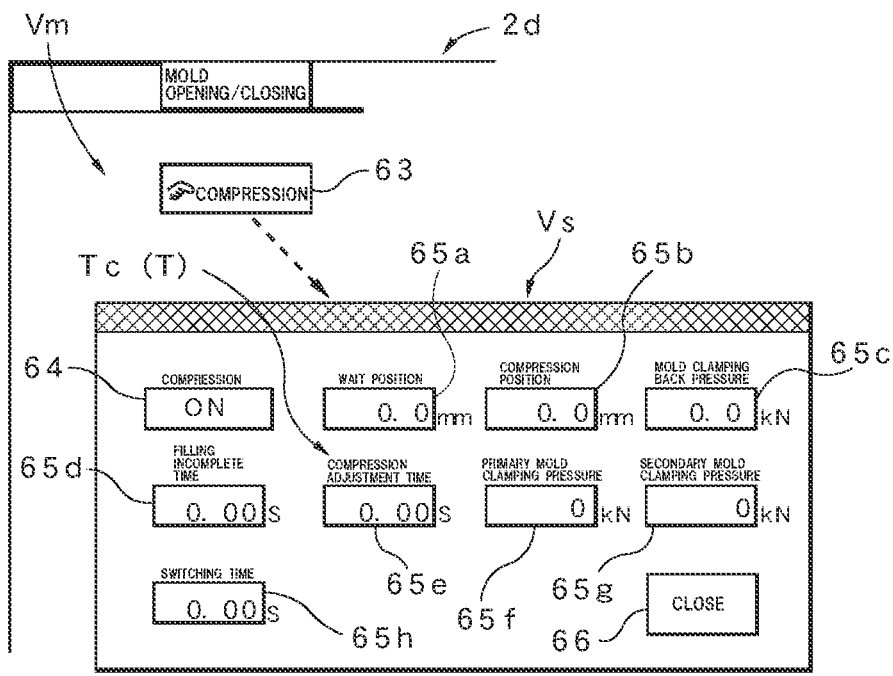
FIG. 5 is a setting screen illustration showing a portion of the display provided in the injection molding machine.

Also, various types of setting screens can be displayed on the display 2d. FIG. 5 shows a portion of a mold opening/closing screen Vm used in the present embodiment. Since a "compression" switch 63 is provided on this mold opening/closing screen Vm, by turning on this "compression" switch 63, a setting screen Vs used in the injection molding method according to the present embodiment can be displayed in a window. This setting screen Vs has a compression ON/OFF selection key 64, a wait position setting section 65a for setting a wait position [mm] of the movable platen 5 before injection, a compression position setting section 65b for setting a compression start position [mm], a mold clamping back pressure setting section 65c for setting a mold clamping holding pressure (back pressure) [kN] during injection, a filling incomplete time setting section 65d for setting a filling incomplete time Ts [sec] in the case of a failure to move to the compression position, a compression adjustment time setting section 65e for setting a compression adjustment time Tc [sec], a primary mold closing pressure setting section 65*f* for setting a mold closing pressure (compression pressure) Pp [kN] for primary compression, a secondary mold closing pressure setting section 65*g* for setting a mold closing pressure (compression pressure) Pp [kN] for secondary compression, and a switching time setting section 65*h* for setting a switching time [sec] for switching to the secondary compression. Notably, reference sign 66 denotes a "close" key of the setting screen Vs.

Next, the injection molding method according to the present embodiment which is performed by using the injection molding machine M will be described step by step according to the flowchart shown in FIG. 6 and with reference to mainly FIGS. 1 and 7 to 12.

When the injection molding method according to the present embodiment is performed, first a setting processing is performed (step S1). In this setting processing, various types of ordinary molding conditions are set, and the above-described various type of items relating to the injection molding method according to the present embodiment are set by using the setting screen Vs shown in FIG. 5.

Figure 8:
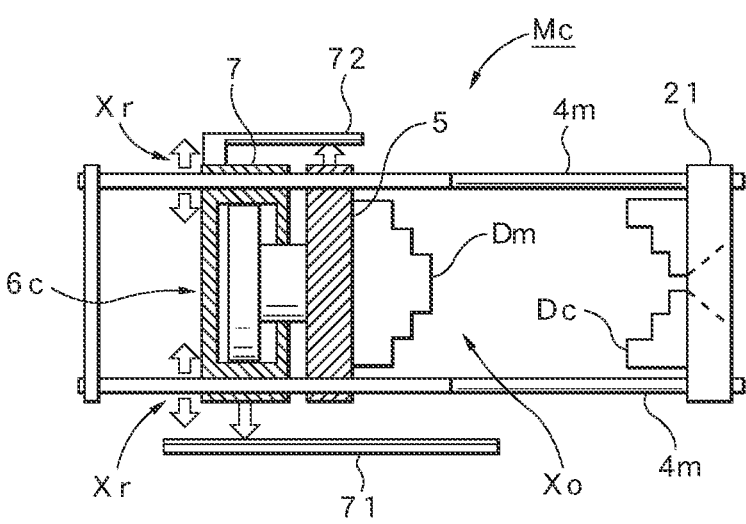
FIG. 8 is a schematic view showing a state of the injection molding machine.

It is assumed that the mold clamping device Mc (the movable mold Dm) is currently located at a mold opening position Xo shown in FIG. 8 (step S2). The mold clamping device Mc (the movable mold Dm) has been moved to this mold opening position Xo as a result of the chuck sections 8*m* being switched to the chucking cancellation position Xr through drive control of the chuck cylinders 24, the movable platen 5 being moved to the most retreated position (the second stationary plate 22 side) through drive control of the mold clamping cylinder 6*c*, and the movable platen 5 and the mold clamping platen 7 being retreated through drive control of the mold opening/closing cylinders 23*a* . . . Notably, in FIG. 8, reference sign 71 denotes an encoder for detecting the position of the mold clamping platen, and reference sign 72 denotes an encoder for detecting the position of the movable platen.

Figure 9:
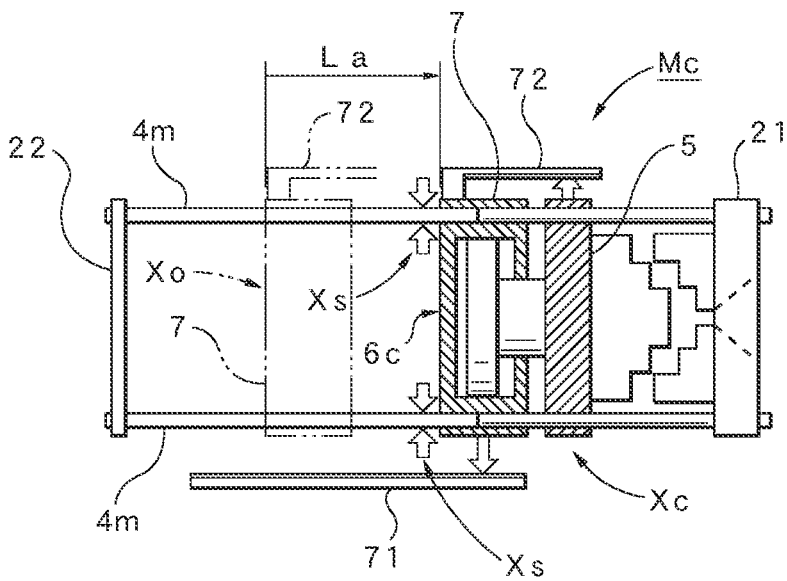
FIG. 9 is a schematic view showing another state of the injection molding machine.

At the time of production (molding), by driving and controlling the mold opening/closing cylinders 23*a* . . . , the movable platen 5 and the mold clamping platen 7 are advanced at high speed from the mold opening position Xo to a chucking position Xc shown in FIG. 9. When they reach the chucking position Xc, by driving and controlling the chuck cylinders 24, the chuck sections 8*m* are switched to the chucking positions Xs, thereby fixing the mold clamping platen 7 to the tie bars 4*m* (step S3). Notably, in FIG. 9, reference sign La denotes the movement stroke of the mold clamping platen 7 from the mold opening position Xo to the chucking position Xc.

Figure 10:
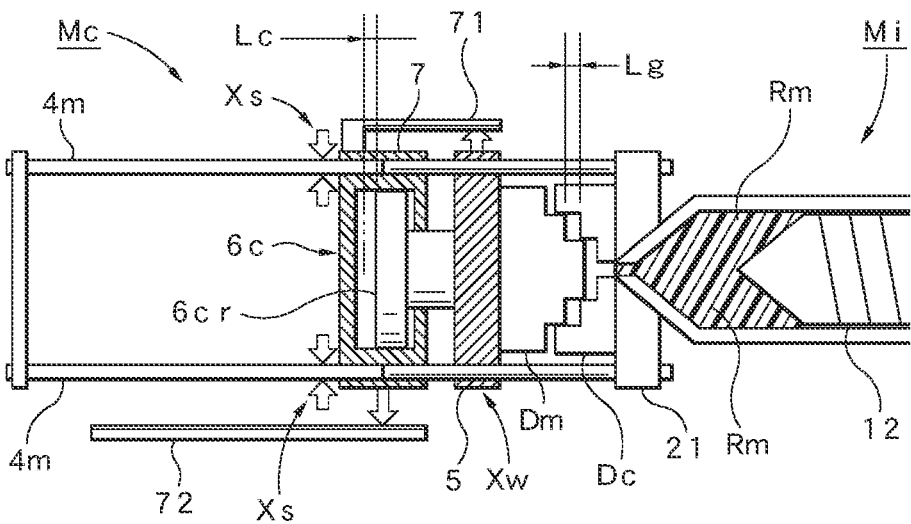
FIG. 10 is a schematic view showing another state of the injection molding machine.

Next, by driving and controlling the mold clamping cylinder 6*c*, the movable platen 5 is advanced, and, by adjusting the gap between the movable mold Dm and the stationary mold Dc, the movable mold Dm is set to a set wait position Xw shown in FIG. 10 (step S4). A set mold gap Lg is provided between the movable mold Dm and the stationary mold Dc at that time. Notably, in FIG. 10, reference sign Lc denotes the movement stroke of the mold clamping ram 6*cr* at the time of adjustment. As a result, preparation for starting injection on the mold clamping device Mc side is completed. Therefore, the directional control valve 53 of the meter-out circuit 9 is switched to a meter-out ON side (step S5).

Meanwhile, in the injection device Mi, the screw 12 rotates as a result of drive control of the screw rotating motor 16. Consequently, a molding material R supplied to the hopper 11*h* is accumulated in front of the screw 12. Also, as a result of drive control of the injection device moving cylinder 17, the injection device Mi advances to a nozzle touch position shown in FIG. 10. As a result, preparation for starting injection on the injection device Mi side is completed.

Notably, in particular, a low fluidity molding material such as a thermosetting resin material can be used as the molding material R In the case where a low fluidity molding material is used as the molding material R as described above, it is possible to provide an injection molding method (injection molding machine M) which is most suitable for molded products which uses the low fluidity molding material.

After completion of the above-described preparations for starting injection, injection of the molding material Rm is started by driving and controlling the injection cylinder 14 (step S6). In this case, immediately before start of injection, the mold gap Lg is present between the movable mold Dm and the stationary mold Dc as described above, injection pressure is zero, and mold clamping force is zero. Therefore, the pressure difference between the forward side and the rear side of the movable platen 5 is zero (balanced state), and the movable platen 5 is in a standstill state. As described above, the predetermined mold clamping force Pc in the mold clamping conditions of the present invention may be zero; i.e., the case where the predetermined mold clamping force Pc is set to zero is contained.

Meanwhile, as result of start of injection, the screw 12 advances, and the molding material Rm is filled, through the injection nozzle 11*n*, into the cavity of the mold D; i.e., the mold gap Lg between the movable mold Dm and the stationary mold Dc (step S7). In this case, a low fluidity molding material is used as the molding material R. However, since the mold clamping force at the beginning is zero, the molding material Rm is injected and filled into the cavity of the mold D relatively smoothly. With progress of the injection filling process, the pressure of the resin Rd within the mold D increases, and the movable platen 5 retreats gradually because the mold clamping platen 7 is fixed in position by the chuck sections 8*m* in the chucking position Xs. At that time, the pressure of the resin Rd is maintained at the set back pressure Pb [kN] by the function of the meter-out circuit 9.

Figure 11:
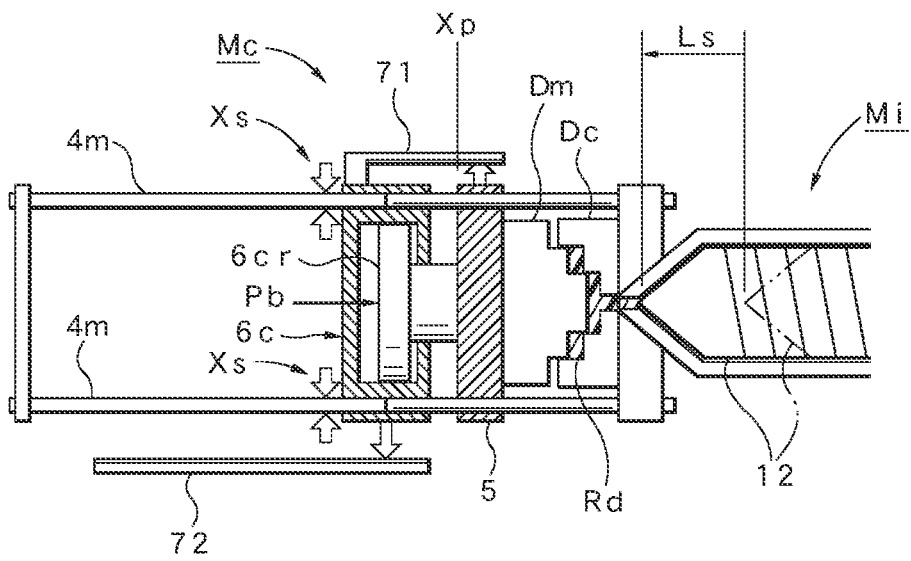
FIG. 11 is a schematic view showing another state of the injection molding machine.

When the movable platen 5 reaches a set compression start position Xp as shown in FIG. 11, an end processing for ending the injection filling process is performed (steps S8 and S10). At that time, the screw 12 advances to a position near a most advanced position. In FIG. 11, reference sign Ls denotes the movement stroke of the screw 12 at the time of injection filling, and reference sign Pb denotes the back pressure [kN] applied to the mold clamping ram 6*cr*. Therefore, in this case, an injection end condition is that the movable platen 5 reaches the compression start position Xp.

In the case where the injection filling processing is ended when the movable mold Dm reaches the compression start position Xp set beforehand, since a desired compression process for the resin Rd can be performed after filling of the resin Rd, it is possible to provide an injection molding method which is the most suitable from the viewpoint of, for example, performing compression molding for molded products using a low fluidity molding material or the like.

When the injection filling process ends, a compression process (primary compression processing) is started (step S11 (S13)). Notably, the compression process may be performed in a multiple pressure mode in which the mold clamping pressure (mold closing pressure) is set to a plurality of levels and a single-pressure mode in which a fixed mold clamping pressure is used.

FIG. 1 shows the case of a two-pressure mode in which a primary compression process (first step) is performed under a primary mold clamping pressure (primary mold closing pressure) Ppsf and then, a secondary compression process (second step) is performed under a secondary mold clamping pressure (secondary mold closing pressure) Ppss. The explanatory view of FIG. 7 shows the case of a single-pressure mode in which the compression process is performed under a fixed mold clamping pressure (mold closing pressure).

Figure 7:
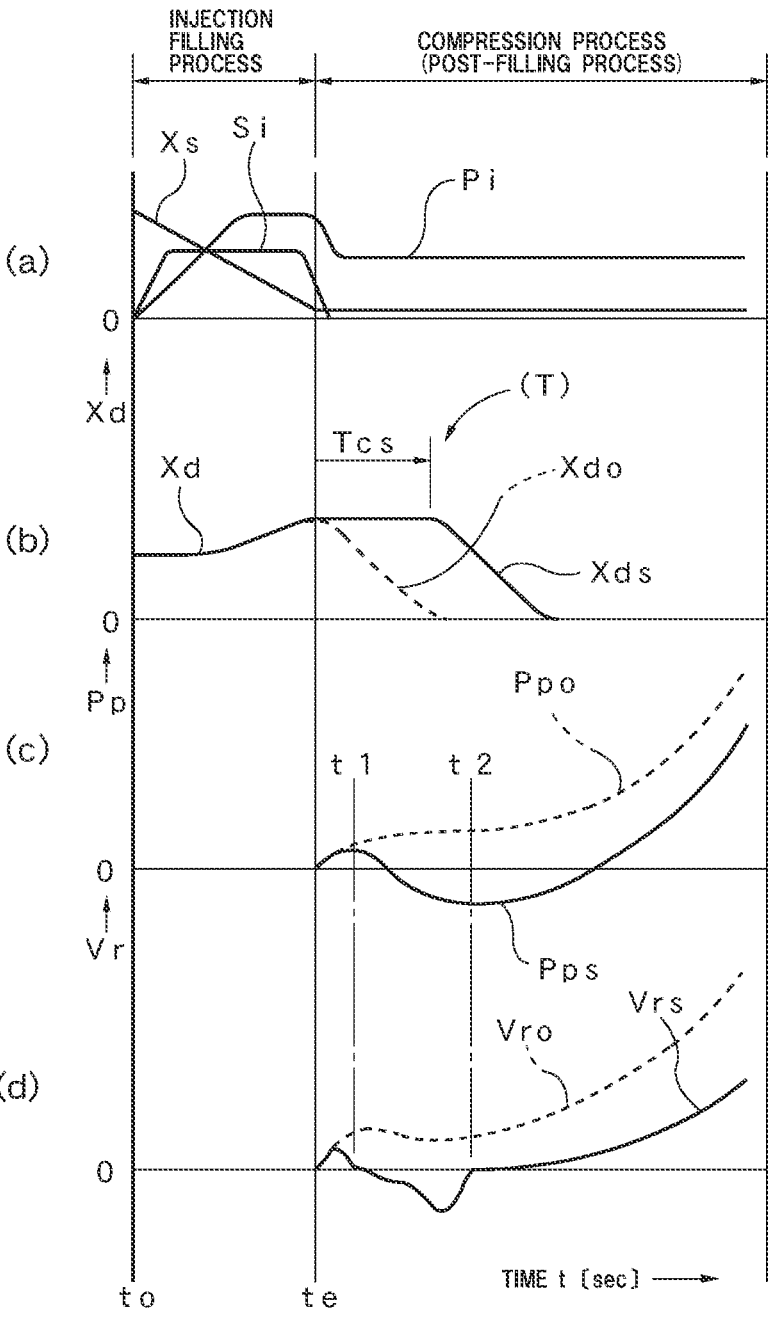
FIG. 7 is a characteristic chart used to describe a mold gap, mold closing pressure, and viscosity (change in mold closing pressure per unit time) in the injection molding machine.

Accordingly, in the case of the single-pressure mode shown in FIG. 7, the compression adjustment time Tc is an adjustment time used for changing the first start time of the compression process, and, in the case of the two-pressure mode shown in FIG. 1, the compression adjustment time Tc is an adjustment time used for changing the switching time point at which the primary compression process is switched to the secondary compression process. As described above, the compression adjustment time Tc is not limited to that used for changing a particular time point and may be used for changing a plurality of time points as needed. Also, the magnitude of the mold closing pressure and/or duration time may be changed. Basically, a mold closing pressure Pp setting pattern including these can be changed freely. This change of the setting pattern serves as the mold closing pressure adjustment condition T. In the case of the present embodiment, the compression adjustment time Tc serves as the mold closing pressure adjustment condition T.

Figure 6:
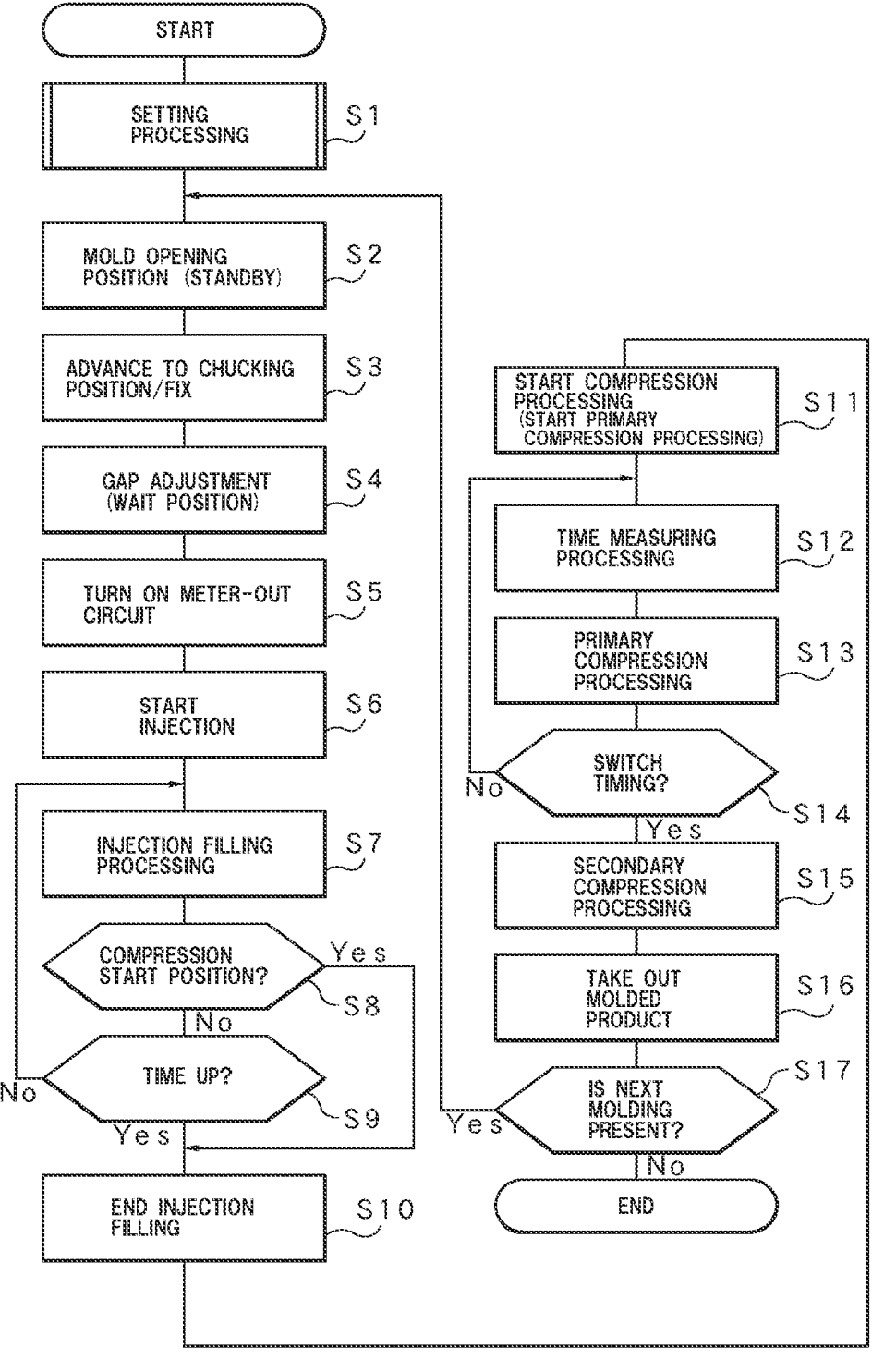
FIG. 6 is a flowchart used for describing processing steps of an injection molding method according to the preferred embodiment of the present invention.
Figure 12:
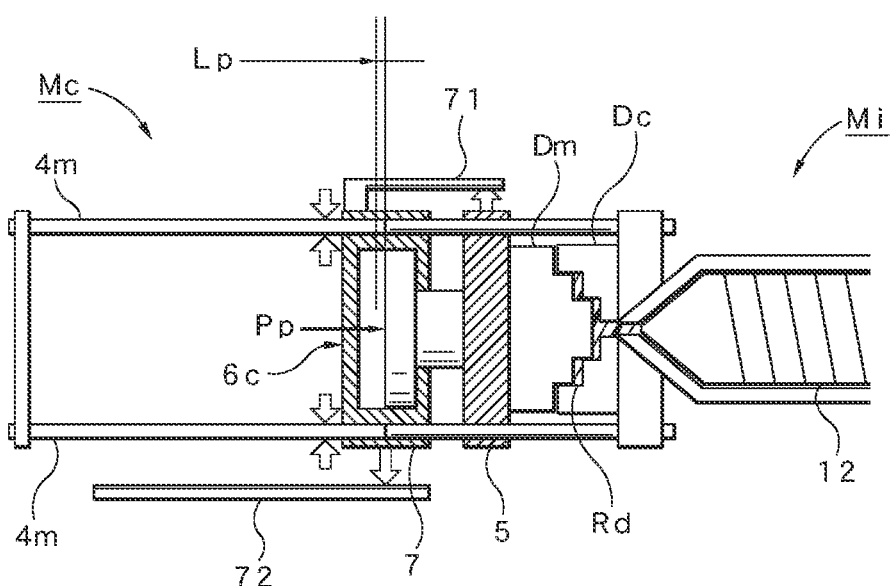
FIG. 12 is a schematic view showing another state of the injection molding machine.

The flowchart of FIG. 6 shows the case of the two-pressure mode. In FIG. 6, upon completion of the injection filling process, a time measuring processing is started, and simultaneously, the primary compression processing is started under the set primary mold closing pressure [kN] (steps S12 and S13). In the compression processing, the meter-out circuit 9 is switched to an OFF state, and, by driving and controlling the mold clamping cylinder 6c, the movable platen 5 is pressed forward (toward the first stationary plate 21 side) with a predetermined pressing force Pp as shown in FIG. 12. When the time measuring processing determines that a switching time [sec], containing the compression adjustment time Tc [sec] set by the compression adjustment time setting section 65e, has come, the primary compression processing is ended and the secondary compression processing (secondary mold closing pressure) is started (steps S14 and S15). As a result, the secondary compression processing is performed over a predetermined period. In FIG. 12, reference sign Lp denotes the amount of displacement of the mold clamping ram 6cr due to the pressing force Pp; i.e., a compression amount. After completion of the secondary compression processing, mold opening is performed, and a processing for ejecting a molded product is performed (step S16). Furthermore, in the case where the next production is continuously performed, the same molding processing is performed (steps S17, S2, . . . ).

Incidentally, setting of the above-described compression adjustment time Tc is important. Sections (a) to (d) of FIG. 7 show characteristic charts used for describing the mold gap Xd, the mold closing pressure Pp, and the viscosity Vr (change ΔP in the mold closing pressure Pp per unit time t), which are displayed in the graphic display section 2dg of the display 2d provided in the injection molding machine M. Notably, the compression process shown in FIG. 7 is the above-described single-pressure mode.

FIG. 7 shows a change in the compression state of molding material Rm in the case where the compression adjustment time Tc is changed; namely, the case where the compression adjustment time Tc is set to "0" (broken line Xdo) and the case where the compression adjustment time Tc is set to "Tcs" (continuous line Xds). In the case where the compression adjustment time Tc is set to "0," the mold gap Xd (shown in section (b) of FIG. 7) decreases from the filling end time point te. In this case, as shown in a mold closing pressure characteristic curve Ppo and a viscosity characteristic curve Vro, which are shown by broken lines in sections (c) and (d) of FIG. 7, the magnitudes of the mold closing pressure [kN] and the viscosity [mPa·s] tend to increase immediately from the filling end time point te.

Meanwhile, in the case where the compression adjustment time Tc is set to "Tcs," the mold gap Xd (shown in section (b) of FIG. 7) does not decrease from the filling end time point te. In this case, as shown in a mold closing pressure characteristic curve Pps and a viscosity characteristic curve Vrs, which are shown by continuous lines in sections (c) and (d) of FIG. 7, the mold closing pressure [kN] and the viscosity [mPa·s] tend to decrease in the period of time t1 to time t2 after the end of filling and increase again after time t2. Notably, in section (a) of FIG. 7, reference sign Si denotes the injection speed, reference sign Pi denotes the injection pressure, and reference sign Xs denotes the screw position.

FIG. 1 shows the graphic display section 2dg in the case where the compression adjustment time Tc is appropriately set in actuality. FIG. 1 shows the case where a relatively small mold gap is present; namely, a mold gap Xd of about 5 [mm] is present. As can be clearly understood from FIG. 1, after the end of filling, the viscosity Vr tends to decrease temporarily and then increase again. Therefore, in this case, by setting the compression adjustment time Tc to Tcs, it becomes possible to render the application timing of the secondary mold closing pressure Ppss coincident with the timing at which the viscosity Vr starts to increase.

In this case, setting of the compression adjustment time Tc may be performed, for example, in such a manner that a trial molding is performed beforehand and an appropriate time value is set as the compression adjustment time Tc at the time of initial setting. Alternatively, setting of the compression adjustment time Tc may be performed in such a manner that the operator sets "0" or an arbitrary provisional value at the time of initial setting, checks the related behaviors (changes) by the graphic display section 2dg in the middle of the molding processing (production processing), and performs setting for alteration (update). As described above, the viscosity of the molding material Rm can be grasped easily and accurately by the graphic display section 2dg, it is possible to set the optimized compression adjustment time Tc.

Since a low fluidity molding material is used as the molding material R, it is expected a case where, in the injection filling processing (step S7), the movable platen 5 needs time to reach the compression start position Xp. In this case, when the set filling incomplete time Ts [sec] elapses before the movable platen 5 reaches the compression start position Xp, the injection filling processing is ended even when the movable platen 5 does not reach the compression start position Xp (steps S9 and S10). Therefore, when the filling incomplete time Ts elapses, the compression processing for pressurizing the resin Rd within the mold D by the movable mold Dm is started (step S11). In this case, the condition that the filling incomplete time (filing time) Ts set beforehand elapses from the start of the injection filling processing becomes the injection end condition. Notably, the compression processing and processing subsequent thereto are the same as those in the case where the movable platen 5 has reached the compression start position Xp. Namely, the primary compression processing with the primary mold clamping pressure, the secondary compression processing with the secondary mold clamping pressure, and the molded product ejection processing are performed (steps S12 to S17).

As described above, the injection filling processing is ended when the filling incomplete time Ts set beforehand elapses from the start of the injection filling processing. Thus, even in the case where the movable platen 5 fails to reach the compression start position Xp within the set filling incomplete time Ts due to, for example, a combination of the type of the low fluidity molding material and the shape of the mold cavity, compression molding by performing the compression processing becomes possible. Thus, it is possible to reduce molding defects due to shortage of resin, thereby increasing the yield of molded products.

In such an injection molding method (injection molding machine M) according to the present embodiment, basically, the mold clamping conditions, including the predetermined mold gap Lg, the predetermined mold clamping force Pc, the predetermined back pressure Pb for the movable mold Dm, the predetermined mold closing pressure Pp, and the predetermined mold closing pressure adjustment condition T associated with the compression state of the molding material Rm, are set, and, at the time of molding, the injection filling process of injecting and filling the molding material Rm by the injection device Mi into the mold D of the mold clamping device Mc, for which the mold clamping conditions have been set, is performed, and, after completion of the injection filling process, the compression process is performed on the basis of the mold clamping conditions including the mold closing pressure adjustment condition T Therefore, even when the molding material Rm is low in fluidity (high in viscosity), filling of the resin into the cavity of the mold D can be performed smoothly. Thus, it is possible to avoid the problem that molding (production) becomes difficult depending on the type of the molding material R, and to expand the range of molding materials R which can be used for injection molding, thereby enhancing universality for objects to be molded.

The preferred embodiment has been described in detail. However, the present invention is not limited to such embodiment, and, as to structures of details, shapes, materials, quantities, numerical values, etc., alteration, addition, and deletion can be performed arbitrarily within a range not departing from the gist of the present invention.

For example, although it is desired that a low fluidity molding material is used as the molding material Rm, basically, various types of molding materials R, including high fluidity molding materials and low fluidity molding materials can be used. Also, when the injection molding method is carried out, it is desired to include, as the compression state of the molding material Rm, the size of the mold gap Lg between the movable mold Dm and the stationary mold Dc, the magnitude of the mold closing pressure Pp, and the magnitude of the viscosity Vr of the molding material Rm. However, various other physical quantities which represent the compression state of the molding material Rm may be contained. Furthermore, the case where the mold gap Lg, the mold closing pressure Pp, and the viscosity Vr are displayed directly and graphically as they are has been described. However, the present invention does not exclude other graphic displays such as graphic display in which the mold gap Lg, the mold closing pressure Pp, and the viscosity Vr are displayed indirectly or in a simplified manner. Furthermore, although it is the best that the injection device Mi and the mold clamping device Mc are driven by the hydraulic circuit 3 including the hydraulic pump 3p, other drive sources and drive circuits are not excluded. Accordingly, although it is desired to drive the injection device Mi and the mold clamping device Mc by the common hydraulic pump 3p, the method of driving the injection device Mi and the mold clamping device Mc is not limited to this drive method. Meanwhile, the illustrated mold clamping device Mc is configured to include the movable platen 5 which is supported by the tie bar mechanism section 4 to be movable forward and rearward and which supports the movable mold Dm, the mold clamping platen 7 which is supported by the tie bar mechanism section 4 to be movable forward and rearward and which includes the mold clamping drive mechanism section 6 for performing clamping of the movable mold Dm, and the chuck mechanism section 8 which is integrally provided on the mold clamping platen 7 and can fix the mold clamping platen 7 at a predetermined position on the tie bar mechanism section 4. However, various types of mold clamping devices having the same function can be utilized. Therefore, although it is desired that the mold clamping cylinder 6c is used in the mold clamping drive mechanism section 6 and the meter-out circuit 9 is connected to the mold clamping cylinder 6c, this can be replaced with other circuits exhibiting the same function.

INDUSTRIAL APPLICABILITY

The injection molding method and the injection molding machine according to the present invention can be used as various types of injection molding machines which plasticize various types of molding materials and inject and fill the molding materials into molds, thereby performing molding, and as injection molding methods used in these injection molding machines.

REFERENCE SIGNS LIST

2: molding machine controller, 2d: display, 2dg: graphic display section, 4: tie bar mechanism section, 5: movable platen, 6: mold clamping drive mechanism section, 6c: mold clamping cylinder, 7: mold clamping platen, 8: chuck mechanism section, 9: meter-out circuit, (S7); injection filling process, (S11 to S15): compression process, M: injection molding machine, Mi: injection device, Mc: mold clamping device, Rm: resin material, D: mold, Dm: movable mold, Dc: stationary mold, Lg: mold gap, Pp: mold closing pressure, Pc: mold clamping force, Pb: back pressure, T: mold closing pressure adjustment condition, Vr: viscosity, Xp: compression start position

CITATION LIST

Patent Literature 1 WO2011/161899

The invention claimed is:

1. An injection molding method in which an injection filling process of injecting and filling a molding material by an injection device into a mold composed of a movable mold and a stationary mold and having a mold gap therebetween is performed, and, after completion of the injection filling process, a compression process of compressing the molding material by applying a predetermined mold closing pressure to the mold by a mold clamping device is performed, wherein mold clamping conditions, including a predetermined mold gap, a predetermined mold clamping force, a predetermined back pressure for the movable mold, a predetermined mold closing pressure, and a predetermined mold closing pressure adjustment condition associated with a compression state of the molding material, are set beforehand, at the time of molding, the injection filling process for causing the injection device to inject and fill the molding material is performed for the mold of the mold clamping device for which the mold clamping conditions have been set, and after completion of the injection filling process, the compression process is performed on the basis of the mold clamping conditions including the mold closing pressure adjustment condition, wherein the molding material is a thermosetting resin material, and wherein the compression state of the molding material includes at least one of:

a size of the mold gap between the movable mold and the stationary mold;

a magnitude of the mold closing pressure; and a magnitude of viscosity of the molding material.

2. The injection molding method according to claim 1, comprising graphically displaying the mold gap, the mold closing pressure, and viscosity of the molding material on a display.

3. The injection molding method according to claim 1, wherein the injection filling process is ended when the movable mold reaches a compression start position set beforehand.

4. The injection molding method according to claim 1, wherein the predetermined back pressure for the movable mold is applied by the mold clamping device, and the predetermined mold clamping force is preset to be zero or substantially minimal during the injection filling process.

* * * * *